United States Patent [19]

Yamakawa et al.

[11] Patent Number: 4,840,246
[45] Date of Patent: Jun. 20, 1989

[54] POWER TRANSMISSION CONTROL SYSTEM FOR A FOUR-WHEEL DRIVE VEHICLE

[75] Inventors: Toru Yamakawa; Fujio Makita, both of Hachioji; Mitsuo Umezawa; Ryuzo Sakikiyama, both of Tokyo, all of Japan

[73] Assignee: Fuji Jukogyo Kabushiki Kaisha, Tokyo, Japan

[21] Appl. No.: 651,546

[22] Filed: Sep. 17, 1984

[30] Foreign Application Priority Data

Sep. 19, 1983 [JP] Japan .................. 58-172665

[51] Int. Cl.$^4$ ............................................. B60K 17/34
[52] U.S. Cl. .................... 180/247; 180/233; 180/197
[58] Field of Search .............. 180/233, 247, 197

[56] References Cited

U.S. PATENT DOCUMENTS 4,417,641 11/1983 Kageyama .................. 180/233 X
4,511,014 4/1985 Makita .................. 180/233

FOREIGN PATENT DOCUMENTS 2104178 3/1983 United Kingdom ................ 180/247

Primary Examiner—Richard E. Gluck
Attorney, Agent, or Firm—Martin A. Farber

[57] ABSTRACT

A power transmission control system for a four-wheel drive vehicle powered by an engine has a transmission for transmitting the power of the engine to main driving wheels of the four-wheel drive vehicle, and a clutch for transmitting the power to auxiliary driving wheels. A hydraulic circuit for operating the clutch and a solenoid operated valve are provided for operating the clutch. Speed sensors are provided for detecting speeds of the main and auxiliary driving wheels in order to detect the slipping of wheels and vehicle speed.

A steering angle is sensed for detecting a large steering angle. An electric circuit is provided to respond to the output of the speed sensors at slipping for engaging the clutch and to respond to large steering angle at low vehicle speed for disengaging the clutch for providing two-wheel driving.

9 Claims, 3 Drawing Sheets

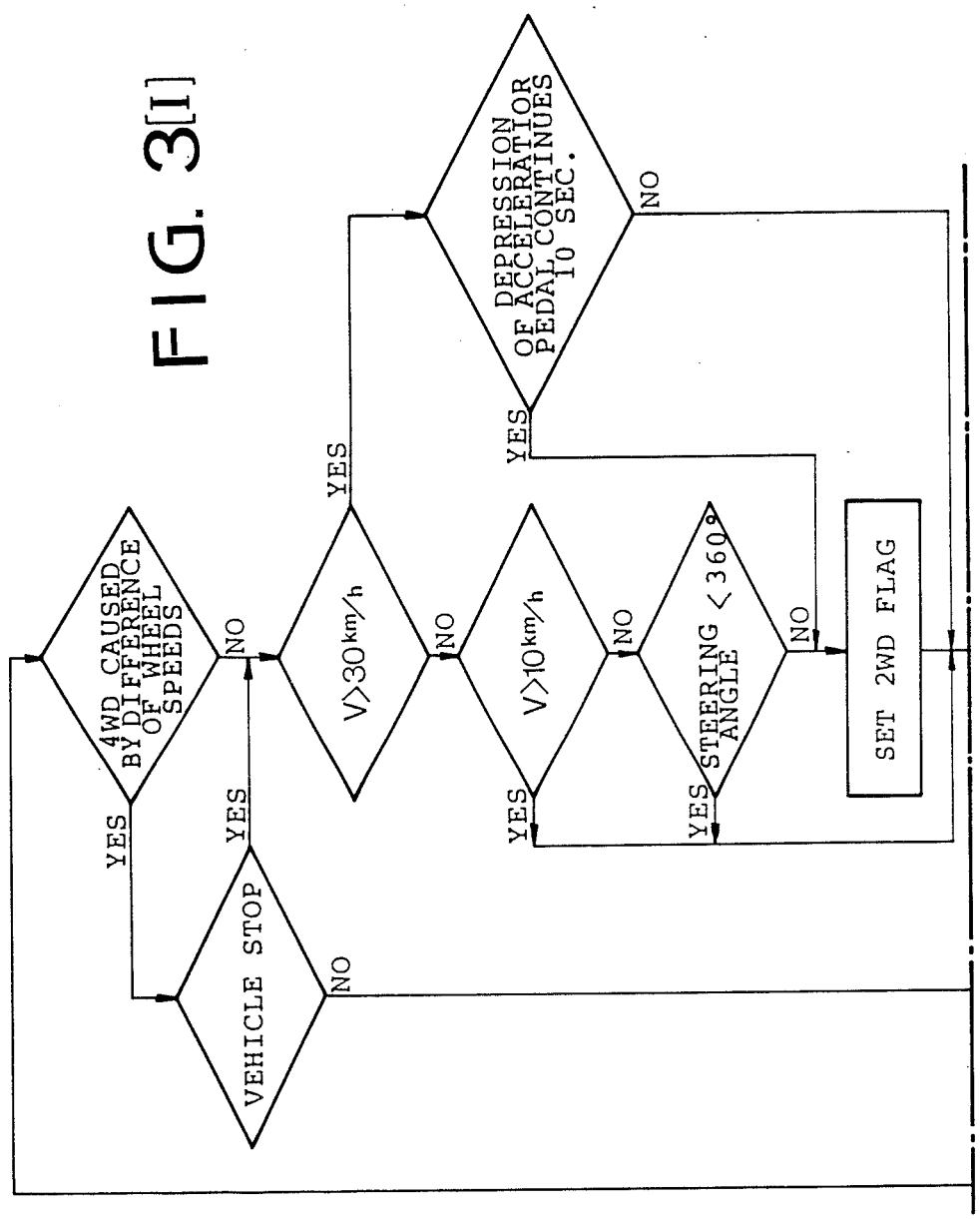

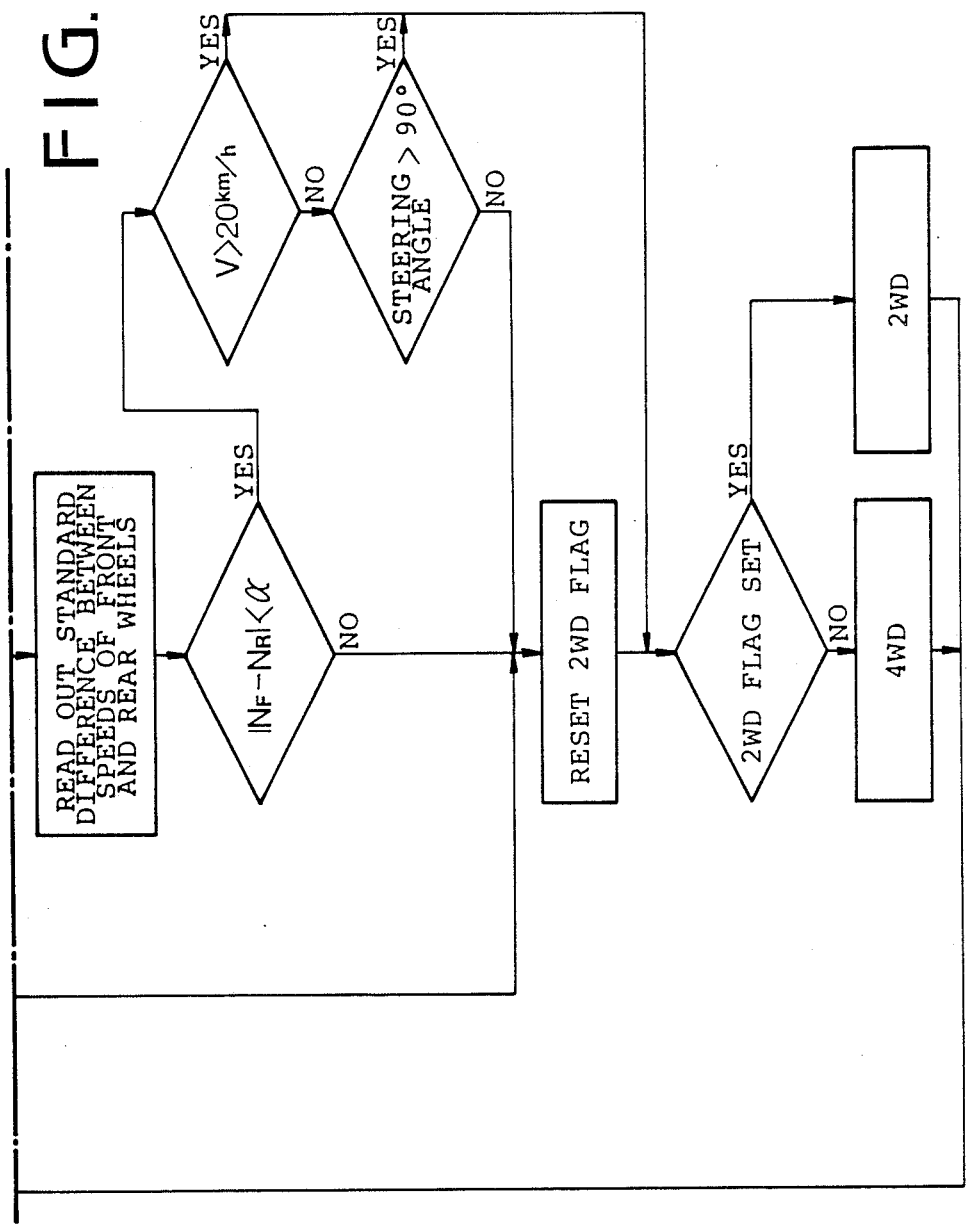

POWER TRANSMISSION CONTROL SYSTEM FOR A FOUR-WHEEL DRIVE VEHICLE

BACKGROUND OF THE INVENTION

The present invention relates to a system for a four-wheel drive vehicle in which the power transmission is automatically changed from two-wheel drive to four-wheel drive or vice versa in accordance with driving conditions.

Japanese patent laid open 55-4292 discloses a four-wheel drive vehicle. The four-wheel drive vehicle is provided with a transfer clutch for transmitting the power of an engine to two auxiliary driving wheels for establishing four-wheel drive.

There has been proposed a four-wheel drive vehicle, a power transmission system of which is automatically changed from four-wheel driving to two-wheel driving in accordance with driving conditions.

Such a four-wheel drive vehicle must be driven with two-wheel driving when turning a sharp corner on paved dry surfaces. the reason is as follows. When the vehicle negotiates corners, the front wheels run through an arc of greater radius than that of the rear wheels and therefore tend to rotate faster than the rear wheels. Such a difference between the speed of the front and rear wheels causes braking of the vehicle, which is called "tight corner braking". In order to prevent such a braking phenomenon, a four-wheel drive vehicle having a transmission system which is automatically changed to two-wheel drive at a large steering angle has been proposed. However, such a system is complicated in construction.

In addition, the tight corner braking has a great effect on the vehicle when the vehicle turns a corner at low speed. Accordingly, the decision on two-wheel driving should be made not only by steering angle, but also by vehicle speed.

SUMMARY OF THE INVENTION

The object of the present invention is to provide a power transmission control system for a four-wheel drive vehicle in which various driving conditions, such as steering angle, difference between front wheel speed and rear wheel speed, and vehicle speed, are detected for providing two-wheel drive, whereby safety in driving and fuel economy may be improved.

According to the present invention, there is provided a power transmission control system for a four-wheel drive vehicle powered by an engine having a transmission for transmitting the power of said engine to main driving wheels of said four-wheel drive vehicle, a clutch for transmitting said power to auxiliary driving wheels of the vehicle, circuit means for operating said clutch in accordance with driving conditions. The clutch providing the four-wheel drive is disengaged to provide the two-wheel drive under the condition that the vehicle speed is lower than a predetermined low speed, the steering angle is larger than a predetermined large angle, and the difference between the speed of the main and auxiliary wheels is smaller than a standard value.

In an aspect of the present invention, the clutch is a hydraulically operated clutch, and the circuit means comprises a hydraulic circuit for operating said clutch. The hydraulic circuit has a solenoid operated valve for controlling a fluid supplied to the clutch, and the first and second means comprise an electric circuit responsive to outputs of the first and second sensors.

The other objects and features of this invention will be apparently understood from the following description with reference to the accompanying drawings.

BRIEF DESCRIPTION OF DRAWINGS

FIG. 3 is a flow chart.

DETAILED DESCRIPTION OF THE PREFERRED EMBODIMENTS

Figure 1:
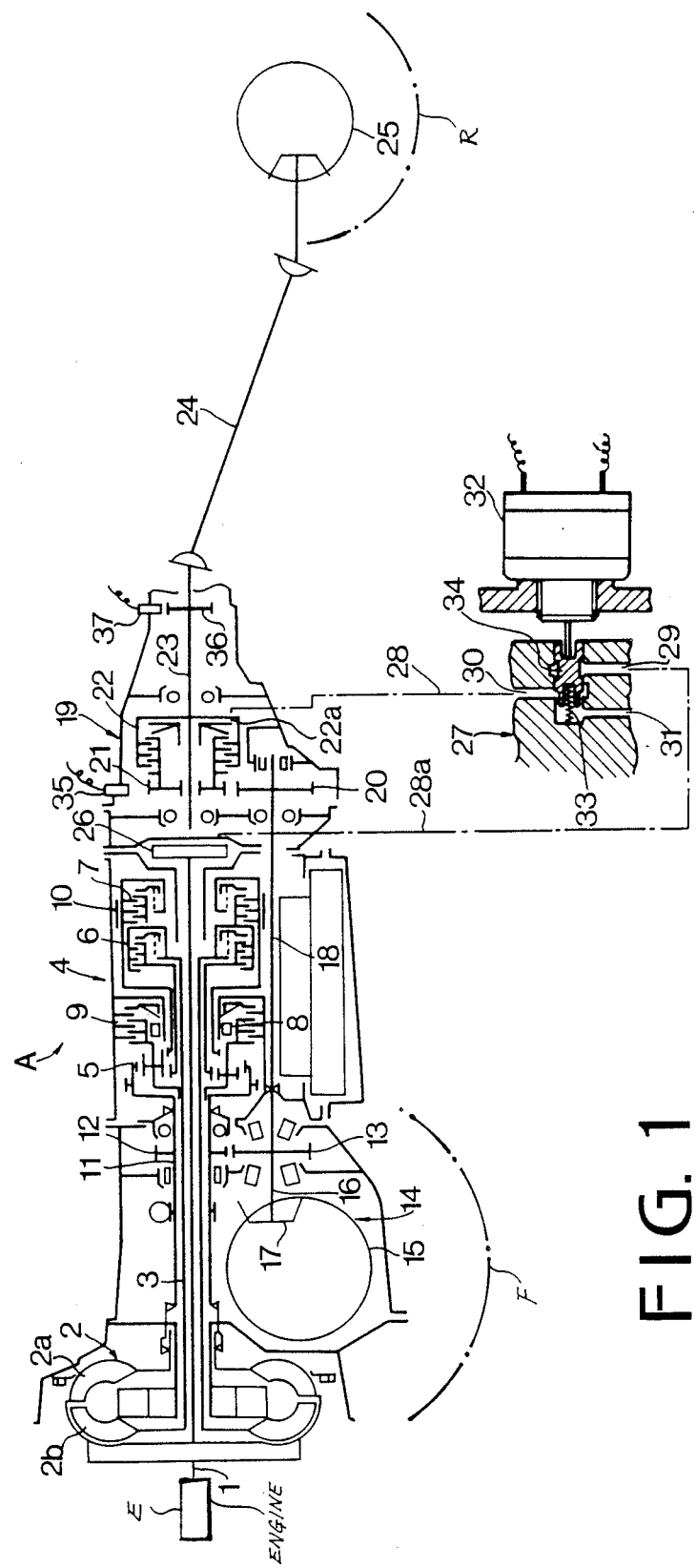
FIG. 1 is a schematic view showing an automatic transmission to which a control system according to the present invention is used.

Referring to FIG. 1, a crankshaft 1 of an internal combustion engine E mounted on a front portion of a vehicle is operatively connected with a torque converter 2 of an automatic transmission A.

The automatic transmission A comprises the torque converter 2, an automatic transmission device 4, and a final reduction device 14 for front wheels F of the vehicle.

The torque converter 2 comprises a pump impeller 2a and a turbine 2b. The pump impeller 2a is connected with the engine crankshaft 1. A turbine shaft 3 is extended from the turbine 2b to the automatic transmission device 4.

The automatic transmission device 4 comprises a planetary gear 5, clutches 6 and 7 for selectively transmitting the output of the turbine shaft 3 to the planetary gear 5, a one-way clutch 8, a brake 9 and brake band 10 for selectively locking elements of the planetary gear 5.

The output of the automatic transmission device is transmitted to an output shaft 11 on which a drive gear 12 is securely mounted and which in turn engages with a driven gear 13. The driven gear 13 is securely mounted on a shaft 16, on one end of which a drive pinion 17 is formed. The drive pinion 17 engages with a crown gear 15 of the final reduction device 14 for the front wheels F. The other end of the shaft 16 is connected to a transfer drive shaft 18 which extends rearwardly and is connected to a first transfer gear 20 of a transfer device 19. The first transfer gear 20 is engaged with a second transfer gear 21. The second transfer gear 21 is rotatably mounted on a rear drive shaft 23. A pressure oil operated friction clutch 22 of the multiple-disk type is mounted on the rear drive shaft 23 for engaging the gear 21 with the shaft 23. The rear drive shaft 23 is further operatively connected to a final reduction device 25 for rear wheels R of the vehicle through a propeller shaft 24.

A pressure chamber 22a of the clutch 22 is communicated with an oil pump 26 through a passage 28, solenoid-operated changeover valve 27 and passage 28a. The changeover valve 27 has an inlet port 29 connected to the oil pump 26, an outlet port 30 connected to the pressure chamber 22a, and a drain port 31.

A spool 34 is operatively connected to a solenoid 32 and biased by a spring 33 to the right. When the solenoid 32 is de-energized, the spool 34 is urged by the spring 33 to close the inlet port 29 and to communicate the outlet port 30 to the drain port 31 as shown in FIG. 1. By draining the pressure chamber 22a, the clutch 22 disengages. When the solenoid 32 is energized, the spool 34 is shifted to the left to close the drain port 31 and to communicate the pressure chamber 22a with the oil pump 26 through the passage 28, ports 30, 29 and passage 28a. Thus, the clutch 22 engages, thereby connecting the gear 21 with the shaft 23 to establish four-wheel drive power transmission.

In the control system of the present invention, a front wheel speed sensor 35 is provided to sense the speed of the gear 21 which is proportional to the speed of the front wheels F and also to the vehicle speed, and a rear wheel speed sensor 37 is provided to detect the speed of a gear 36 mounted on the rear drive shaft 23.

Figure 2:
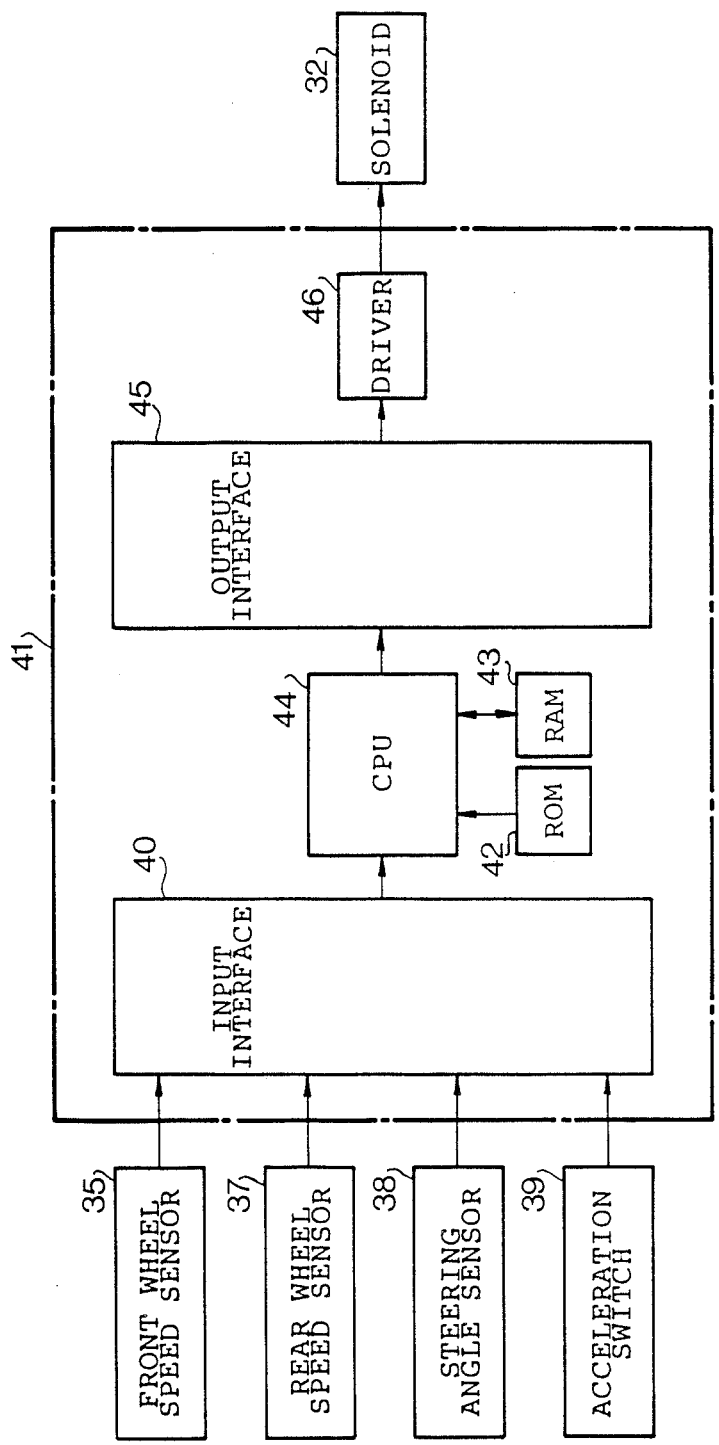
FIG. 2 is a diagram showing an electric circuit provided in the system of the present invention.

Referring to FIG. 2, the system is further provided with a steering angle sensor 38 producing an electric signal in proportion to the steering angle of the vehicle, and with an acceleration switch 39 which is closed when an accelerator pedal of the vehicle is depressed.

Output signals of those sensors and switch are fed to a microcomputer 41 through an input interface 40. The microcomputer 41 comprises a ROM 42 in which various data is stored as a table map and programs, a RAM 43 for storing input signals and others, a CPU 44 for processing input signals according to the programs and for producing an output signal through an output interface 45 and a driver 46. The output signal is applied to the solenoid 32 for the energization thereof.

In ordinary driving conditions, the solenoid 32 is energized to provide the four-wheel driving. When the steering angle exceeds a predetermined value (one revolution of a steering shaft) at low vehicle speed (below 10 km/h), the solenoid is de-energized so that the four-wheel driving is changed to the two-wheel driving in order to prevent tight corner braking. There is provided a hysteresis between changing conditions for the four-wheel drive and the two-wheel drive. Namely, the two-wheel drive caused by the large steering angle at low vehicle speed is changed to the four-wheel drive, when the steering angle becomes lower than another predetermined value (¼ revolution of the steering shaft) at low vehicle speed (below 20 km/h). When the difference between the speed of the front and rear wheels is higher than a predetermined value, which means the front or rear wheels slip, the two-wheel drive is also changed to the four-wheel drive in order to prevent the slipping. Further, when the acceleration switch 39 is closed over a predetermined period (over 10 sec) at high speed (over 30 km/h), the four-wheel drive is changed to two-wheel drive, because the four-wheel drive is not necessary.

The control operation will be described hereinafter with reference to FIG. 3. Initially, it is detected whether the vehicle is driven by the four-wheel drive (4WD) system. If the four-wheel drive is caused by the wheel spaced difference (slipping), the four-wheel driving is not changed to two-wheel drive (2WD), even if conditions for two-wheel drive occur. Namely, the four-wheel driving is maintained until the vehicle stops. When the four-wheel driving is caused by other conditions than slipping, the system detects whether the vehicle speed is higher than 30 km/h, whether the speed is higher than 10 km/h, and further whether the steering angle is less than one revolution. When these conditions are not detected, a 2WD flag is set (this means 2WD flag is 1). Then, a standard difference ($\alpha$) between the speed of the and rear wheels is read out from a map in accordance with the steering angle and vehicle speed. Further, it is detected whether the actual wheel speed difference [NF−NR] (where NF is front wheel speed and NR is rear wheel speed) is smaller than the standard difference ($\alpha$). In addition, vehicle speed and steering angle are detected and 4WD or 2WD is decided.

From the foregoing it will be understood that the present invention provides a control system which operates to change the four-wheel drive to two-wheel drive in accordance with vehicle speed, steering angle and difference between front wheel speed and rear wheel speed, whereby the tight corner braking can be reliably prevented and fuel consumption is improved.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. In a power transmission control system for a four-wheel drive vehicle powered by an engine having a transmission for transmitting power of said engine to main driving wheels of said four-wheel drive vehicle, a clutch for further transmitting said power simultaneously to auxiliary driving wheels of the vehicle, and circuit means for engaging said clutch in accordance with driving conditions, the improvement wherein the circuit means comprises:

first sensors for detecting speeds of shafts for said main and auxiliary driving wheels for producing respective shaft speed signals;
   a second sensor for detecting steering angle for producing a steering angle signal;
   first means for producing a vehicle speed signal when the speed of the vehicle is below a predetermined speed;
   comparing means responsive to the steering angle signal for producing a steering angle decision signal when the steering angle is larger than a predetermined value;
   second means responsive to the shaft speed signals for producing a speed difference signal when the difference between the speeds of the shafts for the main and auxiliary wheels is smaller than a predetermined value;
   decision means responsive to the vehicle speed signal, steering angle decision signal, and speed difference signal for disengaging the clutch for providing two-wheel driving.

2. The power transmission control system according to claim 1 wherein said clutch is a hydraulically operated clutch, and said circuit means includes a hydraulic circuit for operating said clutch.

3. The power transmission control system according to claim 2 wherein said hydraulic circuit has a solenoid operated valve for controlling a fluid supplied to said clutch, and said means comprises an electric circuit responsive to outputs of said first and second sensors.

4. The system according to claim 1, further comprising
   acceleration detecting means for detecting an acceleration condition, and
   said decision means for disengaging the clutch for providing two-wheel driving when said acceleration detecting means detects said acceleration condition for a predetermined time.

5. The system according to claim 1, wherein
   said decision means is for disengaging the clutch for providing two-wheel driving when the vehicle speed is lower than a predetermined low speed and the steering angle is larger than a predetermined large angle.

6. The system according to claim 1, wherein said decision means is for disengaging the clutch for providing two-wheel driving when the vehicle speed is lower than a predetermined low speed, the steering angle is larger than a predetermined large angle and the difference between the speeds of the main and auxiliary wheels is smaller than a predetermined standard difference which depends on the steering angle and the vehicle speed.

7. The system according to claim 5, wherein said decision means is further for engaging the clutch and providing four-wheel drive when the vehicle speed is less than another predetermined low speed which is higher than said first-mentioned predetermined low speed and the steering angle is less than a predetermined angle which is lower than said predetermined large angle.

8. The system according to claim 1, wherein said predetermined values are substantially 10 km/hr and are 360 degrees, respectively.

9. In a power transmission control system for a four-wheel drive vehicle powered by an engine having a transmission for transmitting power of said engine to main driving wheels of said four-wheel drive vehicle, a clutch for further transmitting said power simultaneously to auxiliary driving wheels of the vehicle, and circuit means for engaging said clutch in accordance with driving conditions, the improvement wherein the circuit means comprises:
means for detecting speeds of said main and auxiliary driving wheels;
means for detecting steering angle; and
means for providing two-wheel driving when speed of the vehicle is below a predetermined speed, the steering angle is larger than a predetermined value, and the difference between the speeds of the main and auxiliary wheels is smaller than a predetermined value.

* * * * *